United States Patent
Bogorad et al.

(10) Patent No.: US 6,275,163 B1
(45) Date of Patent: *Aug. 14, 2001

(54) AUTOMATIC SWITCH DIMMER DEVICE

(75) Inventors: Lev Bogorad, Roosevelt Island; Paul Soccoli, Flushing; Michael Ostrovsky, Brooklyn, all of NY (US)

(73) Assignee: Leviton Manufacturing Co., Inc., Little Neck, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,833

(22) Filed: Aug. 24, 1998

(51) Int. Cl.[7] ................................... G08B 21/00
(52) U.S. Cl. ............... 340/686.1; 340/567; 340/691.1; 315/155; 315/156
(58) Field of Search .................... 340/565, 566, 340/567, 691.1, 686.1, 686.6; 315/156, 158, 159, 150

(56) References Cited

U.S. PATENT DOCUMENTS

| | | | |
|---|---|---|---|
| 3,898,383 | * 8/1975 | Herbits | 362/253 |
| 4,021,679 | * 5/1977 | Bolle et al. | 307/117 |
| 5,349,330 | * 9/1994 | Diong et al. | 340/567 |
| 5,357,170 | * 10/1994 | Luchaco et al. | 315/159 |
| 5,406,173 | * 4/1995 | Mix et al. | 315/156 |
| 5,455,487 | * 10/1995 | Mix et al. | 315/150 |
| 5,489,891 | * 2/1996 | Diong et al. | 340/567 |
| 5,646,594 | * 7/1997 | Barben, Jr. et al. | 340/567 |
| 5,764,146 | * 6/1998 | Baldwin et al. | 340/567 |

* cited by examiner

Primary Examiner—Van T. Trieu
(74) Attorney, Agent, or Firm—Paul J. Sutton

(57) ABSTRACT

An occupancy sensor and an automatic dimmer are connected in series with a light source. The detection of motion in the viewing area of the sensor starts the automatic dimmer which moves from its minimum brightness level to its maximum brightness level. One embodiment of the invention includes a key which can be operated to stop the automatic dimmer at some brightness level below the maximum brightness level which is reached if the key is not operated. A second embodiment provides a presetting device whereby the brightness level can be preset. When all motion in the viewing area ceases the automatic dimmer returns the brightness level to the minimum level at a slow rate.

15 Claims, 3 Drawing Sheets

AUTOMATIC SWITCH DIMMER DEVICE

BACKGROUND OF THE INVENTION

1. Field of the Invention

The invention is directed to the field of controlling devices and more particularly to the control of electrical devices within prescribed and limited areas.

2. Description of the Prior Art

At present occupancy sensors are widely used to turn on electrical lamps when motion is detected within a prescribed area and to turn off the electrical lamps when no motion is detected within the prescribed area. The turn on and turn off are abrupt, often startling the person entering or leaving the area and the lights are turned on to their maximum brightness producing glare and discomfort. The brightness level can then be adjusted by use of a separate dimmer device.

SUMMARY OF THE INVENTION

An occupancy sensor is combined with an automatic dimmer and used to control the on/off state of a lamp and its level of brightness. When motion is detected in a prescribed area, the controlled light is turned on by the occupancy sensor to the minimum brightness level settable by said automatic dimmer. The automatic dimmer slowly increases to maximum brightness level at which it remains until no motion is detected within the prescribed area, at which time the automatic dimmer slowly decreases the level of brightness to the minimum level of brightness. In one embodiment, the automatic dimmer has a key which can be operated to stop the automatic dimmer at some level between the minimum and maximum levels of brightness. In another embodiment, the automatic dimmer has a presetting device to permit the level of brightness to be selected in advance of the operation of the automatic dimmer. It is an object of the present invention to provide a novel automatic switch/dimmer device.

It is another object of the present invention to provide a novel automatic switch/dimmer device which employs an occupancy sensor as an on/off switch.

It is another object of the present invention to provide a novel automatic switch/dimmer device which employs an occupancy sensor as an on/off switch and an automatic dimmer to control the level of brightness of an operated lamp.

It is still another object of the present invention to provide a novel automatic switch dimmer device wherein the automatic dimmer slowly operates between minimum and maximum brightness levels.

It is yet another object of the present invention to provide a novel automatic switch/dimmer device which can be stopped at a desired level of brightness during operation of the automatic dimmer.

It is another object of the present invention to provide a novel automatic switch/dimmer device which can be preset to a desired level of brightness.

Other objects and features of the invention will be pointed out in the following description and claims and illustrated in the accompanying drawings, which disclose, by way of examples, the principles of the invention, and the best modes which are presently contemplated for carrying them out.

BRIEF DESCRIPTION OF THE DRAWINGS

In the drawings in which similar elements are given similar reference characters.

DESCRIPTION OF THE PREFERRED EMBODIMENT

Figure 3:
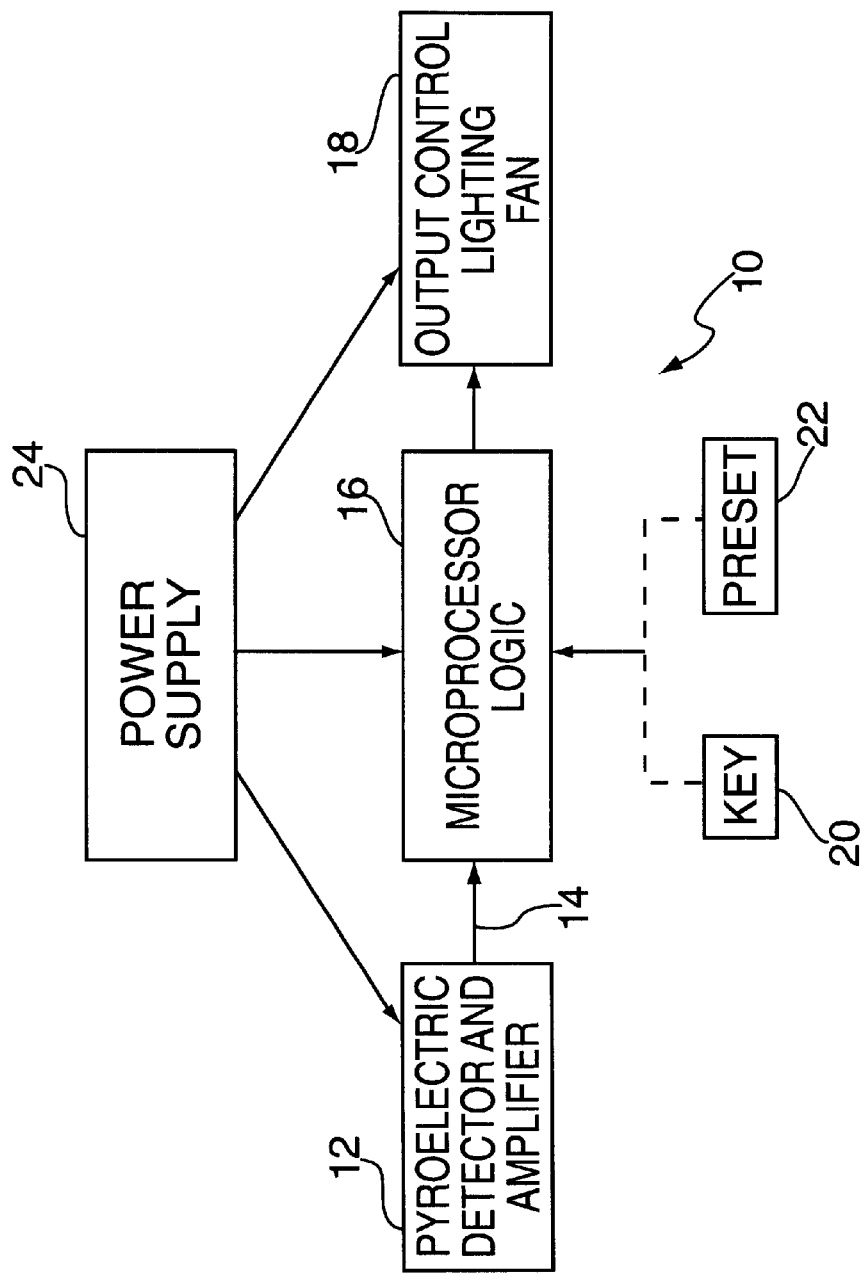
FIG. 3 is a functional block diagram of a device constructed in accordance with the concepts of the invention.

Turning now to FIG. 3 the organization of the automatic switch/dimmer 10 constructed in accordance with the concepts of the invention is set forth. A pyroelectric detector and amplifier 12 provides a first signal to the microprocessor logic device 16. The pyroelectric detector 12 may be an occupancy sensor or a motion sensor, commonly known as PIR (passive infra red) sensors which detect infrared emissions from moving personnel and respond to these emissions by providing an output signal on line 14 to micro processor logic device 16. If no emissions are detected after a preselected duration, the motion sensor terminates its output signal. The motion sensor 12 may be one made by Leviton Manufacturing Co., Inc. Catalog No. 6771. The microprocessor logic device 16 may be a controller model 6320 also manufactured by Leviton Manufacturing Co., Inc. The output of microprocessor logic device 16 is fed to an output control 18 used to control the brightness level of operated lamps (not shown) and/or the speed of fans (not shown). The output control 18 may take the form of a dimmer module such as Leviton model 17700. When operated, the dimmer module 18 turns an operated lamp on or off. In response to signals received from microprocessor logic device 16, the dimmer module 18 can also be stepped down from maximum light output to minimum brightness. Although the discussion thus far has been in terms of lighting, the automatic switch/dimmer device 10 can also be used to control a fan. The output of the microprocessor logic device 16 can be fed to a motor speed control to operate a fan (not shown) as is well known in the art. The fan also includes a delay network so that the fan will operate for a short period after the signals from the microprocessor logic device 16 terminate.

The microprocessor logic device 16 may be connected to a key 20 or a preset control 22. The key 20 may be operated as the dimmer module 18 advances towards maximum brightness level to fix the brightness level at some value other than maximum brightness. The key 20 must be used each time the dimmer module 18 is turned on after having been turned off. The preset control 22 can be used to set the level of brightness and retains its setting after being turned off. It permits a repeatable setting each time a lamp is operated. The occupancy sensor 12, microprocessor logic device 16 and dimmer module 18 are each powered from a power supply 24.

Figure 1:
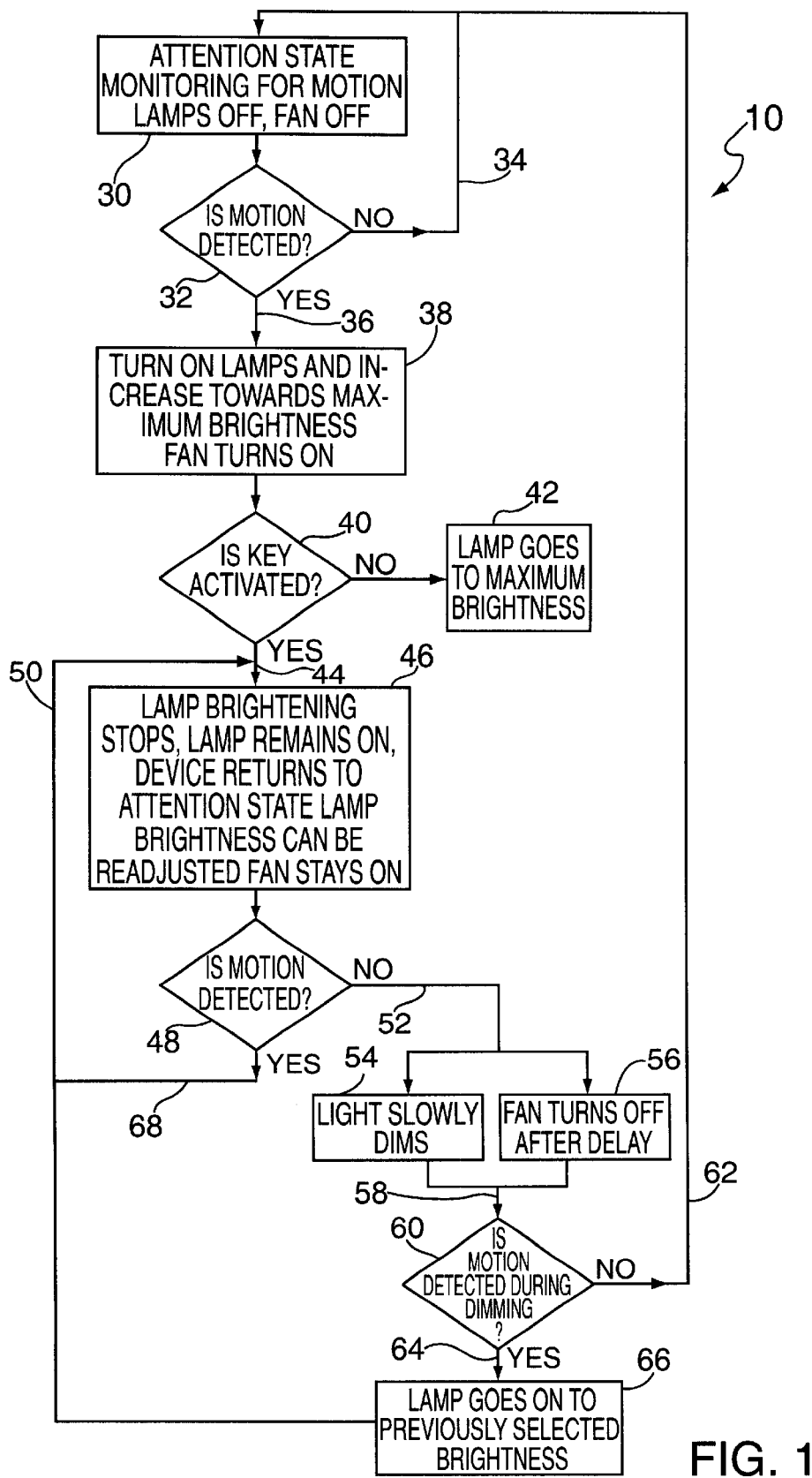
FIG. 1 is a flow chart of a first embodiment of the invention.

Turning now to FIG. 1 there is shown a flow chart illustrating the operation of the automatic switch/dimmer device 10 of the instant invention employing a key. At the start of its operation, automatic switch/dimmer device 10 is in its attention state 30 in which it monitors a prescribed area for motion and the operated lamp and fan are off. The output of attention state block 30 is fed to is motion detection block 32. If no motion is detected a signal is fed on line 34 back to block 30 to main the present condition of block 30. If motion was detected a signal is fed on line 36 to block 38 which results in turning the operated lamps on and increasing the brightness level towards maximum brightness and turns the fan on. The state of the key is tested in block 40.

If the key is not operated then the lamp goes to maximum brightness as shown by block 42. If the key has been activated a signal is fed via line 44 to block 46 where the lamp brightening stops at the key setting, the lamp remains on, and the device 10 returns to the attention state. The fan stays on and the lamp brightness can be readjusted. Motion is then tested in block 48 and if there is motion detected, indicating that personnel are in the prescribed area, a signal is fed back to block 46 via line 50. This signal retains the lamp at the level selected. This operation will continue as long as motion is detected in the prescribed area. In the event no motion occurs, a signal will be fed along line 52 to block 54 which causes the operated lamp to slowly dim and starts the fan turnoff as set out in block 56. While blocks 54 and 56 are operating they pass a signal on line 58 to a further motion detection block 60. If no motion is detected, a signal is fed on line 62 to block 30 which places device 10 in its attention state. If block 60 shows that there is motion, then a signal on line 64 is fed to block 66 to cause the lamp to go on and to its previously selected brightness and block 66 is coupled to block 46 so that the sensor returns to its attention state and the fan stays on. The level of lamp brightness can now be readjusted. Also if motion is detected by block 48 a signal is fed via line 68 to line 50 and back to block 46.

Thus, once motion is detected in a prescribed area which a sensor is monitoring, the lamps will be turned on at the lowest brightness level and will be increased to a maximum brightness level. The brightness level can go to a maximum value or can be stopped at some intermediate level by use of a key operated when the desired brightness level has been reached. The lamp brightening stops and the lamp remains on and the device 10 returns to its attention state, lamp brightness can be readjusted and the fan stays on. If motion is now detected by block 48, a feedback loop via lines 68 and 50 retains the device 10 in its attention state motion is detected by block 48, it is assumed that no personnel are present in the area and block 48 causes the device 10 goes to its attention state. The operated lamp is slowly dimmed to minimum brightness level block 45 and the fan is turned off by block 56. Motion is still monitored by block 60 in the area to prevent turn off of the lamp and fan while someone is still in the area. If motion is detected, by block 60, a signal on line 64 is applied to block 66 and the lamp goes on to previously selected brightness and a signal is fed via line 50 to block 46 to retain the lamp at the set level. If no motion is detected by the device 10 returns to its attention state. Once the device 10 is turned off the key selected brightness level is lost and it must be keyed in again each time the device 10 is put into service.

Figure 2:
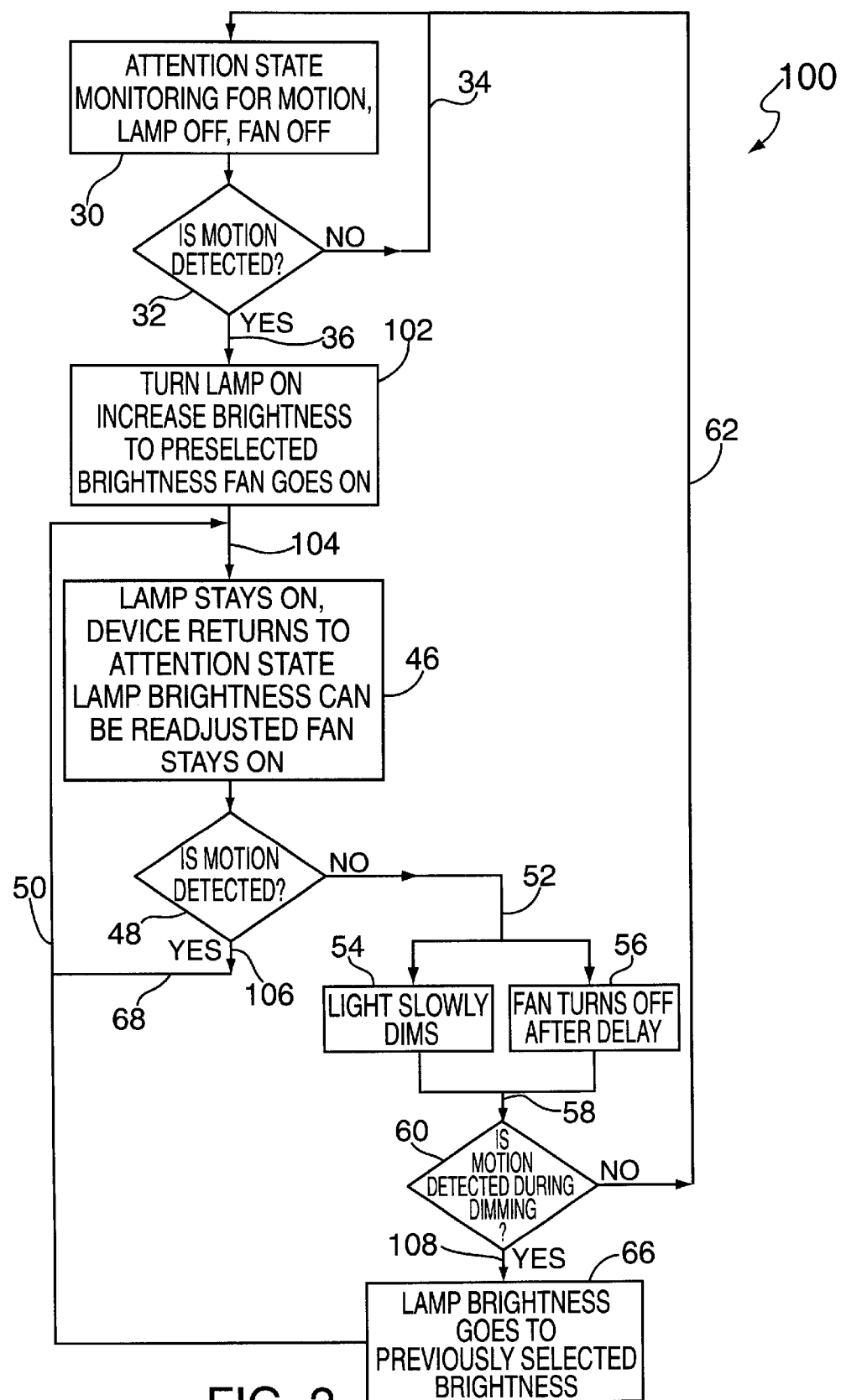
FIG. 2 is a flow chart of a second embodiment of the invention.

The flow chart of FIG. 2 shows a form of device 100 which can be preset to a desired level of brightness and will retain such setting when device 100 is turned off. Block 30 shows the device 100 in its attention state, monitoring for motion, with the lamp and fan off. Block 32 shows the testing for the presence of motion. If no motion is detected a signal via line 34 retains block 30 in its attention state. In the presence of motion a signal is fed via line 36 to block 102 which turns on the lamp and increases the lamp brightness from a minimum to the preselected or preset brightness and turns the fan on. A signal is fed from block 102 via line 104 to block 46. The lamp remains on, the fan stays on and the device 100 returns to its attention state. The lamp brightness can be readjusted. The detector 48 is checked and if motion is detected a signal is fed via lines 106,50 and 104 to block 46 to retain the lamp in its on condition. If no motion is detected an output signal is fed from block 48 to the blocks 54 and 56 via line 52. Block 54 starts to dim the lamp slowly and block 56 starts the fan shut off. The detector 60 is checked for motion during the dimming operation and if no motion is detected, a signal is fed from block 60 to block 30 along line 62 to place the device 100 in its attention state. In the event motion is detected a signal is applied from block 60 to block 66 via line 108 to restore the lamp to its previously selected brightness and a signal is fed via line 50 to the input to block 46 to retain the lamp on and place system 100 in its attention state.

As was true of the device of FIG. 1, once motion is detected in a prescribed area which a sensor is monitoring, a lamp will be turned on by block 102 at the lowest brightness level and will be increased to a maximum brightness level. The brightness level can be increased to a maximum value or can be stopped at some intermediate level by use of the preset device 22. The lamp brightness stops increasing when the preset value is reached and the lamp remains on. If no motion is detected a signal is provided via line 34 to retain the detector or sensor 30 in its attention state with the lamp and fan off. If motion is detected by block 32, a signal is fed to block 102 via line 36 and then via line 104 to block 46, the lamps and fan remain on and the device 100 returns to its attention state. At this time the brightness level of the lamp can be readjusted or reset. Sensor 48 is checked and if motion is detected a signal is fed back via lines 106 and 50 to block 46 to retain the lamp at its preset brightness level and the sensor in its attention state. In the absence of motion a signal is provided to block 54 via line 52 cause the lamp to slowly dim and the fan to initiate its shut down due to the signal on line 52 from block 48 to block 56. The detector 60 is monitored during this dimming and shut down. If no motion is detected a signal on lines 62 to block 30 places the device 100 in its attention state with the lamp and fan off. The detection of motion causes the lamp to return to its previously selected level of brightness and causes the lamp to stay on, the fan to stay on and the detector or sensor block 30 to be in its attention state.

While there have been shown and described and pointed out the fundamental novel features of the invention as applied to the preferred embodiments, as are presently contemplated for carrying them out, it will be understood that various omissions and substitutions and changes of the form and details of the devices illustrated and in their operation may be made by those skilled in the art, without departing from the spirit of the invention.

What is claimed is:

1. An automatic switch/dimmer device for switching an electric lamp on/off and automatically adjusting the brightness level of such lamp comprising:

a) a lampsocket for receiving a lamp therein, said lampsocket connected to an automatic dimmer which is connected to a source of electric power by at least one first conductor;

b) a lamp in said lampsocket;

c) an occupancy sensor coupled to said automatic dimmer, said occupancy sensor providing a first signal to said automatic dimmer for turning on said lamp when motion is detected in a prescribed area;

d) a selection input device for receiving an operation selection setting; and e) said automatic dimmer, responsive to the operation selection setting, for controlling the brightness level of said lamp in increasing or decreasing brightness level steps in response to the presence or absence of said first signal respectively.

2. A automatic switch/dimmer device, as defined in claim 1, wherein said automatic dimmer automatically and sequentially steps the brightness level of said lamp between a minimum level and a maximum level of brightness.

3. An automatic switch/dimmer device, as defined in claim 2, wherein upon receipt of said first signal said automatic dimmer increases in sequential steps, the brightness level of said lamp from said minimum brightness level to said maximum brightness level and in the absence of said first signal decreases in sequential steps the brightness level of said lamp from a current level of brightness level to said minimum brightness level.

4. An automatic switch/dimmer device, as defined in claim 3, wherein said automatic dimmer has a control means coupled thereto with the control means connected to the selection input device for receiving and processing the operation selection setting, wherein the control means can be preset for a selected brightness level and stops said automatic dimmer at said preset brightness level.

5. An automatic switch/dimmer device, as defined in claim 1, wherein said first signal is no longer provided when motion is not detected in said prescribed area and said automatic dimmer automatically lowers the level off lamp brightness to said minimum level of brightness at a slow rate.

6. An automatic switch/dimmer device, as defined in claim 1, wherein said automatic dimmer has a control means coupled thereto with the control means connected to the selection input device for receiving and processing the operation selection setting, wherein the control means can be preset for a selected brightness level and stops said automatic dimmer at a preset brightness level.

7. An automatic switch/dimmer device, as defined in claim 1, wherein said first signal is no longer provided when motion is not detected in said prescribed area and said automatic dimmer automatically lowers the level off lamp brightness to said minimum level of brightness at a slow rate.

8. An automatic switch/dimmer device for switching an electric lamp on/off and automatically adjusting the brightness level of such lamp comprising:

a) a lampsocket for receiving a lamp therein, said lampsocket connected to an automatic dimmer which is connected to a source of electric power by at least one first conductor;

b) a lamp in said lampsocket;

c) an occupancy sensor coupled to said automatic dimmer, said occupancy sensor providing a first signal to said automatic dimmer for turning on said lamp when motion is detected in a prescribed area; and d) said automatic dimmer controlling the brightness level of said lamp in increasing or decreasing brightness level steps in response to the presence or absence of said first signal respectively, said automatic dimmer automatically and sequentially steps the brightness level of said lamp between a minimum level and a maximum level of brightness, upon receipt of said first signal said automatic dimmer increases sequential steps the brightness level of said lamp from said minimum brightness level to said maximum brightness level and in the absence of said first signal decreases in sequential steps the brightness level of said lamp from a current brightness level to said minimum brightness level, wherein said automatic dimmer has a key coupled thereto which can be selectively operated to stop said automatic dimmer at a selected brightness level between said minimum and maximum brightness levels.

9. The method of controlling the brightness of a lamp, comprising the steps of:

a) employing an occupancy sensor to sense a prescribed area and produce a first signal if motion is detected in said prescribed area;

b) employing said first signal to operate an automatic dimmer which is sequentially stepped from a minimum level of brightness to a maximum level of brightness;

c) in the later absence of said first signal to sequentially step said automatic dimmer from a current level of brightness to a minimum level of brightness at a slow rate; and d) responding to an operation selection setting input at a selection input device associated with the automatic dimmer to select operation of the automatic dimmer.

10. The method of claim 9, further comprising, before step (d), the step of:

c1) actuating the selection input device of said automatic dimmer to generate the operation selection setting to stop the operation of said automatic dimmer at a selected brightness level.

11. The method of claim 9, further comprising the step of:

e) presetting said automatic dimmer to stop the operation of said automatic dimmer at a preselected brightness level.

12. The method of claim 9, further comprising the step of:

e) operating said automatic dimmer to a preselected brightness level if a first signal is generated while said automatic dimmer is reducing its current brightness level to said minimum brightness level.

13. The method of controlling the brightness of a lamp, comprising the steps of:

a) employing an occupancy sensor to sense a prescribed area and produce a first signal if motion is detected in said prescribed area;

b) employing said first signal to operate an automatic dimmer which is sequentially stepped from a minimum level of brightness to a maximum level of brightness:

c) in the later absence of said first signal to sequentially step said automatic dimmer from a current level of brightness to a minimum level of brightness at a slow rate, and d) depressing a key on said automatic dimmer to stop the operation of said automatic dimmer at a selected brightness level.

14. The method of claim 13, further comprising the step of:

e) presetting said automatic dimmer to stop the operation of said automatic dimmer at a preselected brightness level.

15. The method of claim 13, further comprising the step of:

e) operating said automatic dimmer to a preselected brightness level if a first signal is generated while said automatic dimmer is reducing its current brightness level to said minimum brightness level.

* * * * *